United States Patent
Takahashi

(10) Patent No.: US 9,235,176 B2
(45) Date of Patent: Jan. 12, 2016

(54) ONE-WAY CLUTCH, DRIVING TRANSMISSION UNIT, FIXING DEVICE, AND IMAGE FORMING APPARATUS

(71) Applicant: CANON KABUSHIKI KAISHA, Tokyo (JP)

(72) Inventor: Masahiro Takahashi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/288,694

(22) Filed: May 28, 2014

(65) Prior Publication Data

US 2015/0003871 A1    Jan. 1, 2015

(30) Foreign Application Priority Data

Jun. 28, 2013  (JP) .................................. 2013-136405

(51) Int. Cl.
  *G03G 15/20* (2006.01)
  *G03G 21/16* (2006.01)
  *F16D 41/00* (2006.01)

(52) U.S. Cl.
  CPC ............ *G03G 15/2064* (2013.01); *F16D 41/00* (2013.01); *G03G 15/2032* (2013.01); *G03G 21/1647* (2013.01)

(58) Field of Classification Search
  CPC .......... G03G 15/2035; G03G 15/2032; G03G 20/1647; F16D 41/00; F16D 2125/50; F16D 2500/1087; F16D 41/18; F16D 41/06; F16H 7/08; F16H 1/2836; F16H 1/003; F16H 57/082; F16H 57/021
  USPC ..................... 74/406; 475/305, 346, 337, 331
  See application file for complete search history.

(56) References Cited

U.S. PATENT DOCUMENTS

| 8,298,112 | B2 | 10/2012 | Takada |
| 2005/0130794 | A1* | 6/2005 | Jinbo ............................ 475/331 |
| 2013/0068581 | A1* | 3/2013 | Araki et al. .............. 192/45.002 |

FOREIGN PATENT DOCUMENTS

| JP | 05-022867 U | 3/1993 |
| JP | 06-118784 A | 4/1994 |
| JP | 2525010 Y2 | 2/1997 |
| JP | 2008-304050 A | 12/2008 |
| JP | 5230979 B2 | 7/2013 |

* cited by examiner

*Primary Examiner* — Clayton E Laballe
*Assistant Examiner* — Ruifeng Pu
(74) *Attorney, Agent, or Firm* — Fitzpatrick, Cella, Harper & Scinto

(57) ABSTRACT

In the present invention, a one-way clutch has an input gear, a planet gear provided in the input gear, an output gear, a stopper wall. When the input gear rotates in the backward direction, the stopper wall is separated from the planet gear. Wherein any one of the planet gear and the input gear has a boss being coaxial with the center of the other of the planet gear and the input gear, and the other of the planet gear and the input gear has a groove in an elongated hole shape which the boss fits in. When the input gear rotates in the forward direction, the boss slides to one end of the groove, and the planet gear is wedged between the stopper wall and the inner teeth. When the input gear rotates in the backward direction, the boss slides to the other end of the groove so that the planet gear separates from the locking member.

8 Claims, 7 Drawing Sheets

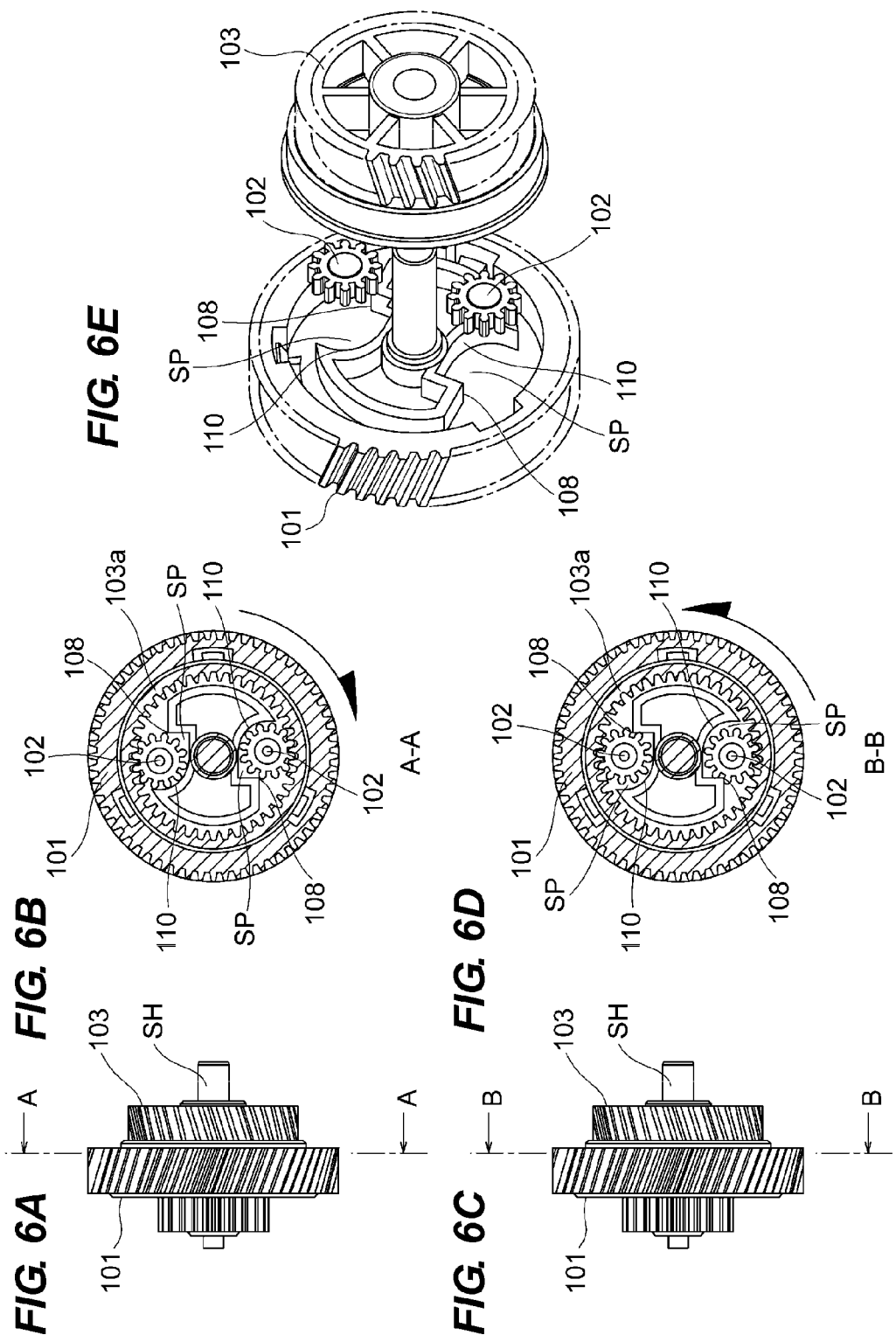

ONE-WAY CLUTCH, DRIVING TRANSMISSION UNIT, FIXING DEVICE, AND IMAGE FORMING APPARATUS

BACKGROUND OF THE INVENTION

1. Field of the Invention

The present invention relates to a one-way clutch for transmitting or cutting off driving force received from a driving source to a driven member in accordance with rotation direction, and relates to a driving transmission unit and an image forming apparatus using the one-way clutch.

2. Description of the Related Art

In various apparatuses, it is desired to rotate and drive multiple rotating members (driven members) using less number of motors (driving sources). For example, in an image forming apparatus, it is desired to rotate multiple developing sleeves using one motor, and rotate not only a developing sleeve but also a photosensitive member using one motor.

In a configuration for rotating multiple rotating members using one motor, it is desired to selectively rotate any given rotating member. For example, although not only the developing sleeve but also the photosensitive member are rotated using one motor, it may be desired to selectively rotate only the photosensitive member in some cases.

In reply to this request, a configuration has been made, in which a one-way unit (one-way clutch) is provided in a driving transmission path extending from a motor to rotating members, and the motor is rotated in the forward and backward directions to selective drive the rotating members (Japanese Patent Laid-Open No. 6-118784). In a generally-available one-way unit, multiple balls and needles are arranged in a peripheral direction, and therefore, there are many components, and the structure is complicated. Therefore, a small one-way clutch is expensive.

Japanese Utility Model Laid-Open No. 5-22867 suggests a one-way unit having a relatively small number of components and having a simple configuration. More specifically, this one-way unit includes an input gear and an output gear, and has a planet gear arranged in a space between an input gear and an inner gear of an output gear.

When a forward rotation driving force is received by the input gear, the planet gear is moved by the teeth of the inner gear provided on the output gear according to the rotation of the output gear with respect to the input gear. Accordingly, the teeth of the planet gear engages in a wedge-like manner with the gap formed by the edge portion provided on the input gear and the inner gear provided on the output gear. Therefore, the input gear and the output gear are integrally connected, and the driving which is received by the input gear is transmitted to the output gear.

When a backward rotation driving force is received by the input gear, the planet gear is moved in the direction opposite to that of the forward rotation by the teeth of the inner gear provided on the output gear according to the rotation of the output gear with respect to the input gear. Then, while the tooth tip of the planet gear slides on a cylindrical receiving portion provided on the input gear, it engages with the inner gear provided on the output gear, and because of the idle rotation, the driving force is not transmitted to the output gear.

However, the one-way unit described in Japanese Utility Model Laid-Open No. 5-22867 is arranged in the driving transmission path extending from the motor to the rotating member, and when the driving force in the direction in which the driving force is not transmitted to the output gear (backward rotation) is received by the input gear in order to selectively rotate the rotating member, nonperiodic hitting sounds of harmonics are generated. More specifically, the planet gear which idles on the cylindrical receiving portion provided on the input gear is in unstable condition in terms of the axial distance from the inner gear. In addition, the planet gear rotates at a higher speed than the input gear or the output gear. Therefore, this causes vibration with irregular hitting sounds, and abnormal sound is generated together with the tooth tip sliding sound.

SUMMARY OF THE INVENTION

Accordingly, in the present invention, it is desirable to provide a one-way clutch using a relatively small number of components with a simple configuration and capable of reducing the abnormal sound when the driving is cut off, and to provide a driving transmission unit, a fixing device, and an image forming apparatus using the one-way clutch.

In order to solve the above problem, a representing configuration of a one-way clutch, a driving transmission unit, a fixing device, and an image forming apparatus according to the present invention includes an input gear, a planet gear provided in a space inside of the input gear, an output gear having an inner teeth meshing with the planet gear, a locking member provided in a space inside of the input gear, the locking member rotating together with the input gear, wherein when the input gear rotates in a forward direction, the locking member locks the planet gear so as not to allow the planet gear to rotate on its own axis, thus transmitting driving to the output gear, and when the input gear is rotated in the backward direction, the locking member is separated from the planet gear, a protruding portion provided on any one of the planet gear and the input gear, the protruding portion being coaxial with the center of the other of the planet gear and the input gear, a groove in an elongated hole shape provided on the other of the planet gear and the input gear, the protruding portion fitting in the groove in a slidable manner, wherein when the input gear rotates in the forward direction, the protruding portion slides to one end of the groove, and the planet gear is wedged between the locking member and the inner teeth, and when the input gear rotates in the backward direction, the protruding portion slides to the other end of the groove so that the planet gear separates from the locking member.

Further features of the present invention will become apparent from the following description of exemplary embodiments with reference to the attached drawings.

BRIEF DESCRIPTION OF THE DRAWINGS

FIGS. 6A to 6E are explanatory diagrams illustrating a one-way clutch according to the comparative example. FIG. 6A is a cross sectional view illustrating the one-way clutch during the backward rotation. FIG. 6B is a cross sectional view taken along the line A-A of FIG. 6A. FIG. 6C is a cross sectional view illustrating the one-way clutch during the forward rotation. FIG. 6D is a cross sectional view taken along line B-B of FIG. 6C. FIG. 6E is an exploded perspective view illustrating the one-way clutch according to the comparative example.

DESCRIPTION OF THE EMBODIMENTS

First Embodiment

A first embodiment of a one-way clutch, a driving transmission unit, a fixing device, and an image forming apparatus according to the present invention will be described with reference to drawings.

Figure 1A:
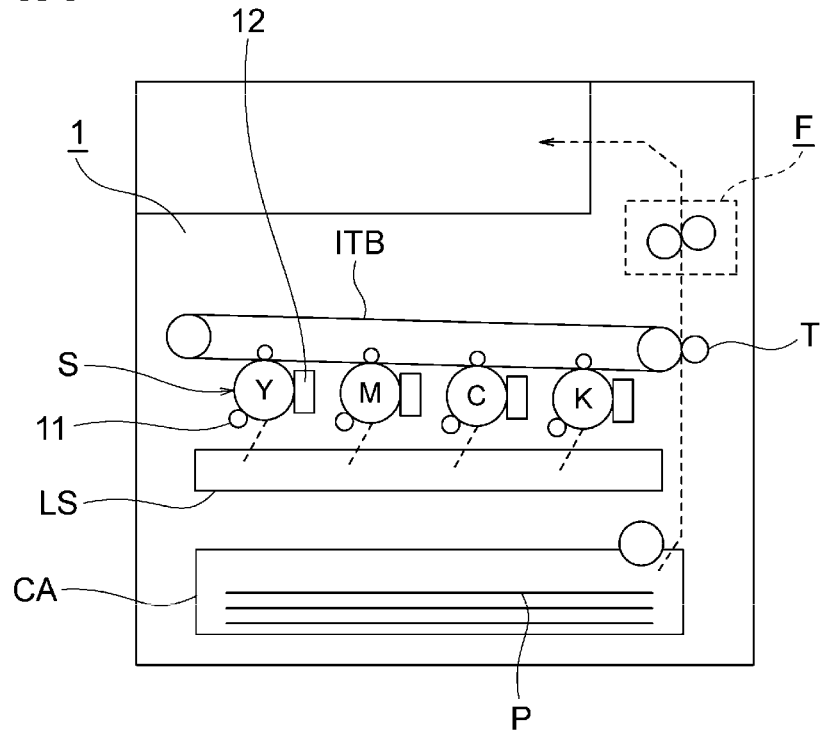
FIG. 1A is a configuration diagram illustrating an image forming apparatus according to a first embodiment.

FIG. 1A is a configuration diagram illustrating an image forming apparatus 1 according to the present embodiment. As illustrated in FIG. 1A, the image forming apparatus 1 includes first to fourth stations (image forming portions) S in yellow (Y), magenta (M), cyan (C), black (Bk).

Each station S includes a photosensitive drum (image bearing member) 10 and a charging device 11 for charging the photosensitive drum 10. The photosensitive drum 10 charged by the charging device 11 is exposed by laser light according to image information given by a laser scanner LS, and an electrostatic latent image is formed on the photosensitive drum. The electrostatic latent image formed on the photosensitive drum is developed as a toner image using toner of each color accommodated in the developing device 13. The toner image of each color developed on each photosensitive drum is transferred to an intermediate transfer belt (intermediate transfer member) ITB in an overlapping manner.

The toner image transferred onto the intermediate transfer belt ITB is transferred onto a sheet P conveyed from a cassette CA at a secondary transfer portion T. The sheet P having the toner image transferred thereon is heated and pressurized by the fixing device F, so that the toner image is fixed thereon, and the sheet P is discharged to the outside of the apparatus main body.

Figure 1B:
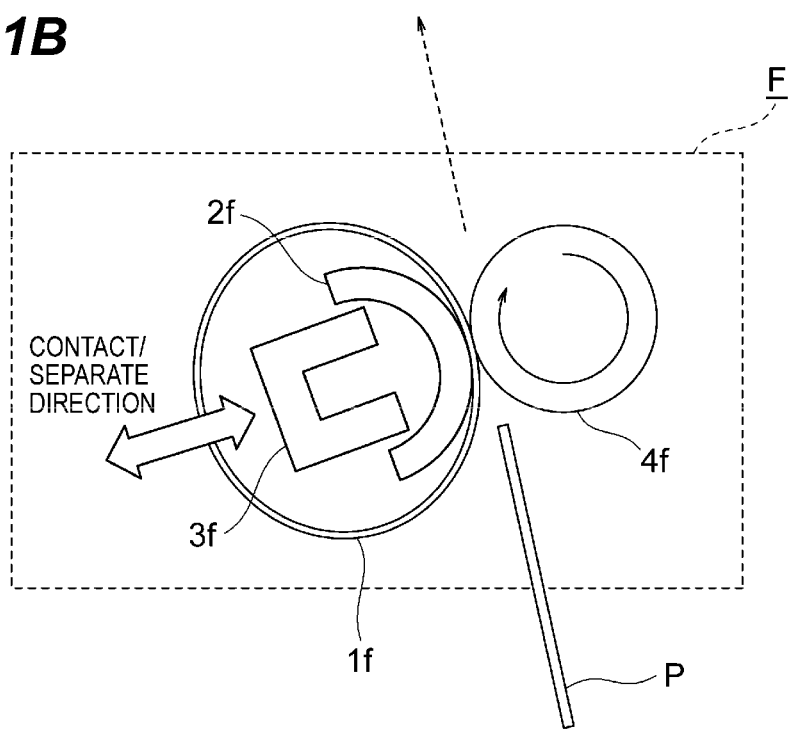
FIG. 1B is a configuration diagram illustrating a fixing device according to the first embodiment.

(Fixing device F) FIG. 1B is a configuration diagram illustrating the fixing device F according to the present embodiment. As illustrated in FIG. 1B, the fixing device F includes a heating film (heating member) 1f, a pressure roller (pressure member) 4f. The heating film 1f is a film-shaped (belt-shaped) heating member for heating unfixed toner by being in contact with the unfixed toner. The pressure roller 4f and the heating film 1f form a nip portion. A plate-shaped heating body (ceramic heater) 2f and a support stay 3f for stably forming a heating nip are arranged inside of the heating film 1f.

Figure 2A:
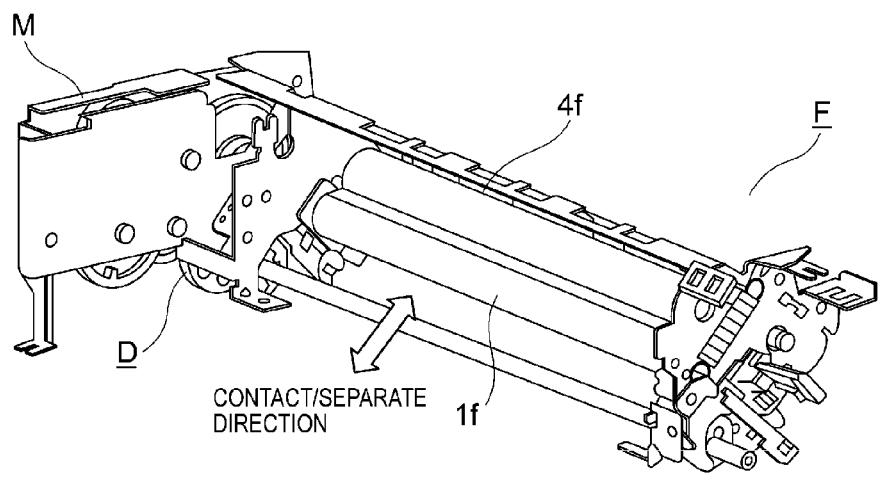
FIG. 2A is a perspective view illustrating the fixing device according to the first embodiment.
Figure 2B:
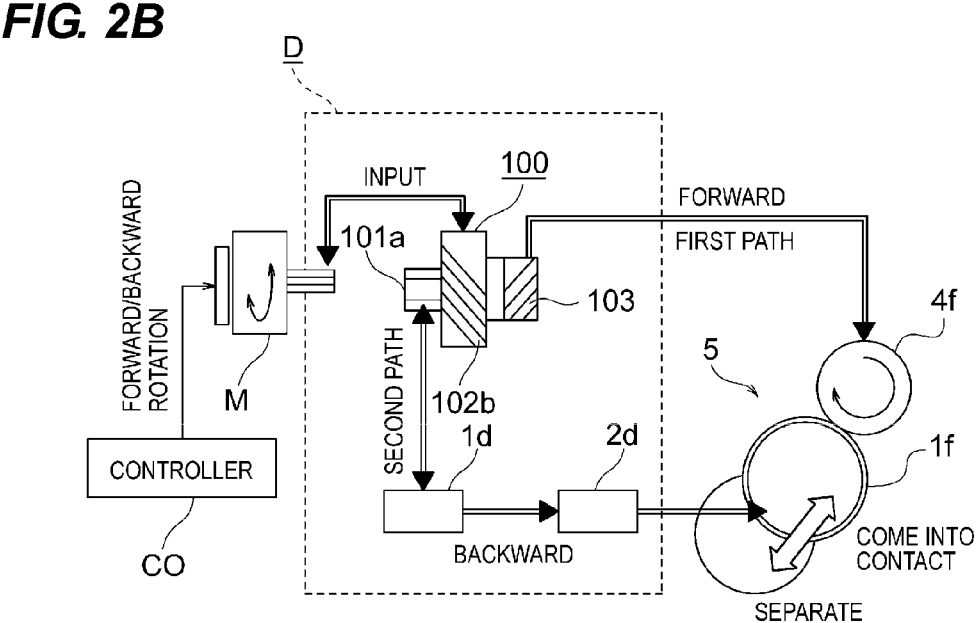
FIG. 2B is a schematic diagram illustrating a driving path according to the first embodiment.

FIG. 2A is a perspective view illustrating the fixing device F and the driving row D of the present embodiment. FIG. 2B is a schematic diagram illustrating a driving transmission path according to the present embodiment. As illustrated in FIGS. 2A, 2B, during image formation, the controller (control device) CO controls one driving source (motor M) so as to cause the driving source (motor M) to rotate in the forward direction. When a sensor (not illustrated) detects jam, the controller CO controls the motor M so as to cause the motor M to rotate in the backward direction.

When the motor M is rotated in the forward direction, the rotation driving force is transmitted via the driving row (driving transmission unit) D to the pressure roller 4f. When the motor M is rotated in the backward direction, the heating film 1f and the pressure roller 4f are separated from each other. Regardless of the rotation direction of each element, the rotation direction of each element when the motor M rotates in the forward direction (forward rotation) will be referred to as a forward direction, and the rotation direction of each element when the motor M rotates in the backward direction (backward rotation) will be referred to as a backward direction.

The driving row D includes not only a transmission gear for transmitting driving but also a one-way unit (one-way clutch) 100, a first path, and a second path. The first path is a path for transmitting the driving received by a tooth surface (first tooth surface) 101b of the one-way unit 100 so as to transmit the driving from the output gear 103 of the one-way unit 100 to the pressure roller 4f. The second path is a path for transmitting the driving received by a tooth surface (first tooth surface) 101b of the one-way unit 100 to transmit the driving from the tooth surface (second tooth surface) 101a of the one-way unit 100 via an oscillating gear 1d and a pressure cancellation cam 2d to the heating film 1f.

Figure 3A:
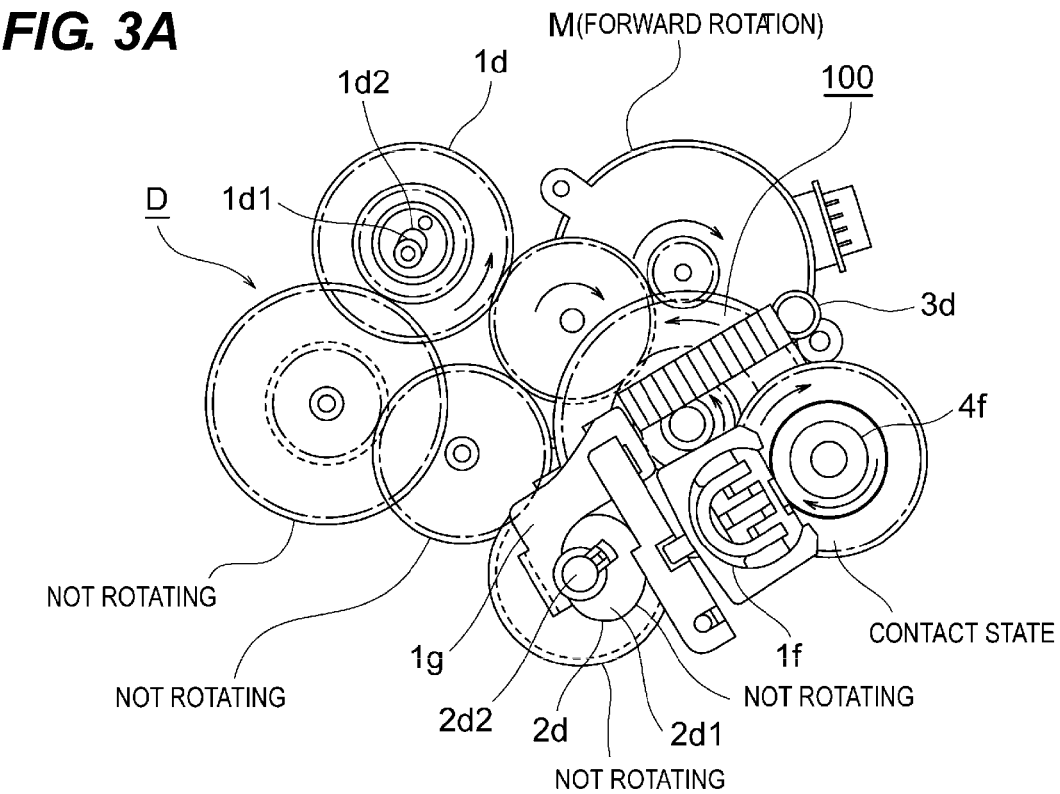
FIG. 3A is a figure illustrating posture and operation of the fixing device according to the first embodiment when the motor is rotated in the forward direction.

(During forward rotation) FIG. 3A is a figure illustrating the posture and the operation of the fixing device F when the motor M is rotated in the forward direction. As illustrated in FIG. 3A, when the motor M is rotated in the forward direction, the driving force is transmitted by the first path. More specifically, the one-way unit 100 rotates and drives the pressure roller 4f.

When the motor M is rotated in the forward direction, the driving force is cut off by the second path. More specifically, the axis of the oscillating gear 1d is deviated by an elongated hole portion 1d2 supporting a shaft 1d1, and the transmission gear 1e at the downstream side does not rotate. Therefore, the pressure cancellation cam 2d does not rotate, and the cam surface 2d1 of the pressure cancellation cam 2d is not displaced with respect to a cam rotation center 2d2, and the heating film 1f and the pressure roller 4f maintains a contact state pressurized by a spring 3d.

Figure 3B:
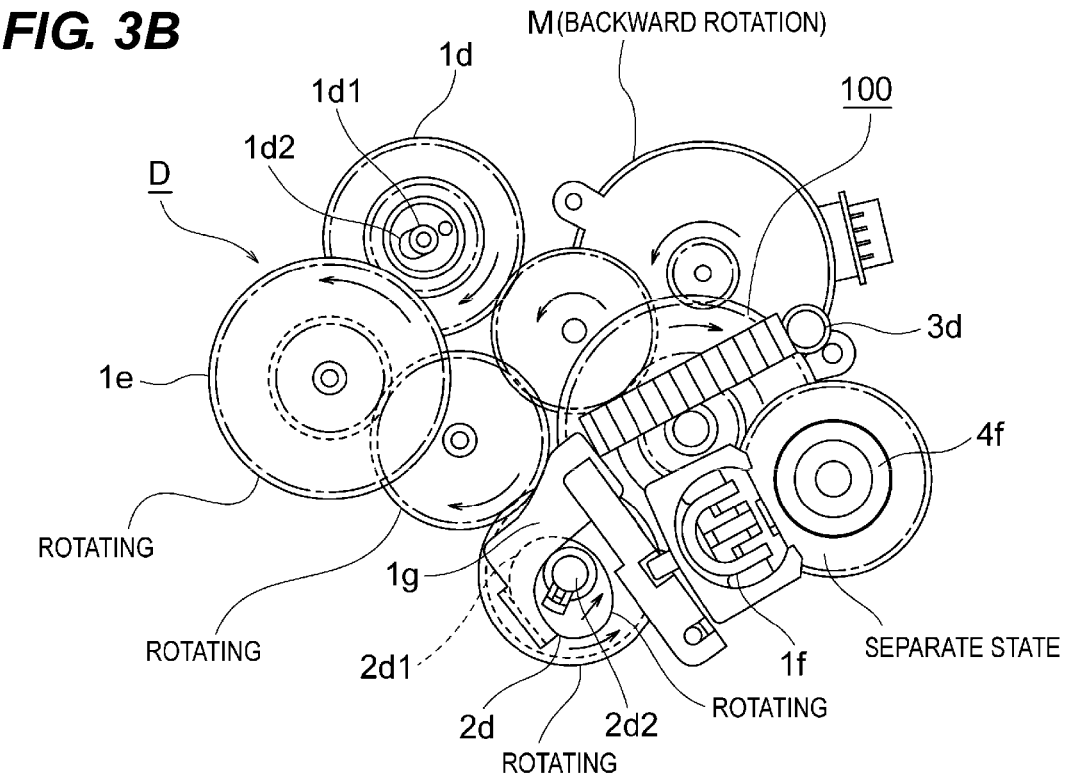
FIG. 3B is a figure illustrating the posture and the operation of the fixing device according to the first embodiment when the motor is rotated in the backward direction.

(During backward rotation) FIG. 3B is a figure illustrating the posture and the operation of the fixing device F when the motor M is rotated in the backward direction. As illustrated in FIG. 3B, when the motor M is rotated in the backward direction, the driving force is not transmitted by the first path. More specifically, the one-way unit 100 does not transmit the driving force to the pressure roller 4f, and the rotation of the pressure roller 4f is at a stop.

When the motor M is rotated in the backward direction, the driving force is transmitted by the second path. More specifically, when the backward rotation is transmitted to the oscillating gear 1d, the shaft 1d1 moves in the elongated hole portion 1d2, and the driving force is transmitted to the transmission gear 1e at the downstream side. Accordingly, the pressure cancellation cam 2d rotates, and the cam surface 2d1 is displaced with respect to the cam rotation center 2d2, and an arm 1g supporting the heating film 1f is rotated against the urging force of the spring 3d, and the heating film 1f and the pressure roller 4f are separated from each other.

A separate sensor 5 (see FIG. 2B) detects the position of the arm 1g, thus detecting the contact state and the separate state. When the separate sensor 5 detects that the heating film 1f and the pressure roller 4f are separated, the controller CO stops the rotation of the motor M.

When jam recovery is finished, and jammed sheet is no longer detected in the fixing nip by the sensor, the controller CO rotates the motor M in the backward direction until the separate sensor 5 detects the contact state. When the pressure cancellation cam 2d further rotates in the backward direction, the cam surface 2d1 is displaced, and the arm 1g is pulled by the spring 3d and returns back to the pressure position.

As described above, the forward and backward rotation of the motor M is controlled, so that when image formation is done with one motor, the pressure roller 4f is rotated, and when jam is detected, the driving force in the backward direction is transmitted to the pressure cancellation cam 2d, so that the heating film 1f and the pressure roller 4d can be separated. Therefore, the workability during jam recovery can be improved.

Although the fixing device is used as an example for the explanation, the driving row of the present case can be applied to various purposes such as a portion for selectively driving a roller for conveying a sheet and rotation/driving of a rotary-type developing device.

Figure 4A:
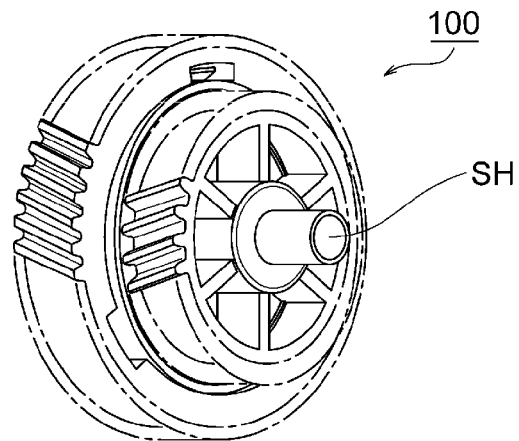
FIG. 4A is a perspective view illustrating a one-way clutch according to the first embodiment.
Figure 4B:
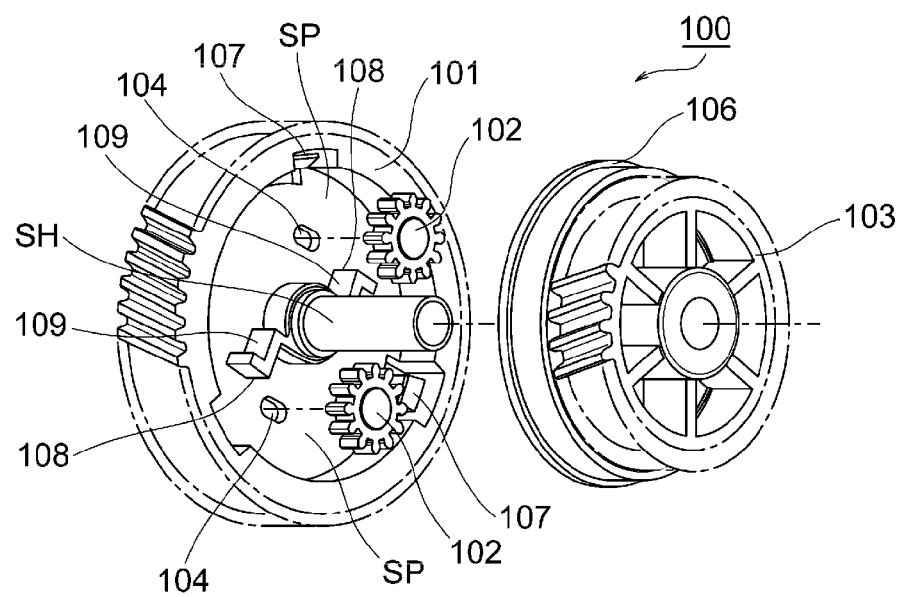
FIG. 4B is a configuration diagram illustrating the one-way clutch according to the first embodiment.
Figure 4C:
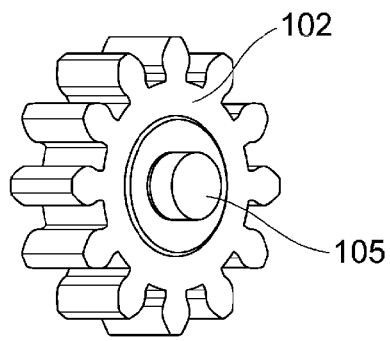
FIG. 4C is a perspective view illustrating a planet gear according to the first embodiment.

(One-way unit 100) FIG. 4A is a perspective view illustrating the one-way unit 100. FIG. 4B is a configuration diagram illustrating the one-way unit 100. FIG. 4C is a perspective view illustrating the planet gear 102.

As illustrated in FIGS. 4A and 4B, the one-way unit 100 is loosely fit on the rotation shaft SH. The one-way unit 100 includes an input gear 101, planet gears 102, and an output gear 103.

The input gear 101 is formed in a depressed shape by an annular rib, and a tooth surface 101b is formed on the external periphery of the annular rib. Two planet gears 102 are provided in the space SP enclosed by the annular rib of the input gear 101. The space SP inside of the input gear 101 is closed by the output gear 103.

As illustrated in FIG. 4C, a boss (protruding portion) 105 is provided on the surface of the planet gear 102 facing the input gear 101. The planet gear 102 and the boss 105 are coaxial. The input gear 101 has a groove 104 in an elongated hole shape on the surface for forming the space SP. The boss 105 engages with the groove 104 in a slidable manner. The planet gear 102 selectively switches connection or disconnection between the input gear 101 and the output gear 103 in accordance with the relative rotation direction of the input gear 101 and the output gear 103.

As illustrated in FIG. 4B, a stopper wall (locking member) 109 is provided on the surface of the input gear 101 facing the planet gear 102. The stopper wall 109 has an edge portion 108. A hook portion 107 is provided on the surface of the input gear 101 facing output gear 103. The hook portion 107 is caught by the external diameter portion 106 of the output gear 103, and holds the output gear 103 in a rotatable manner so that it is not separated from the input gear 101 in the thrust direction.

Figure 5A:
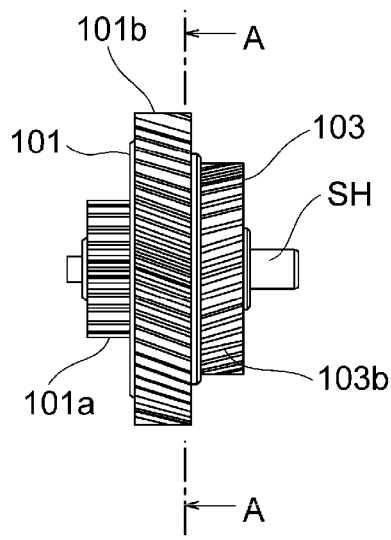
FIG. 5A is a cross sectional view illustrating the one-way clutch according to the first embodiment during backward rotation.
Figure 5B:
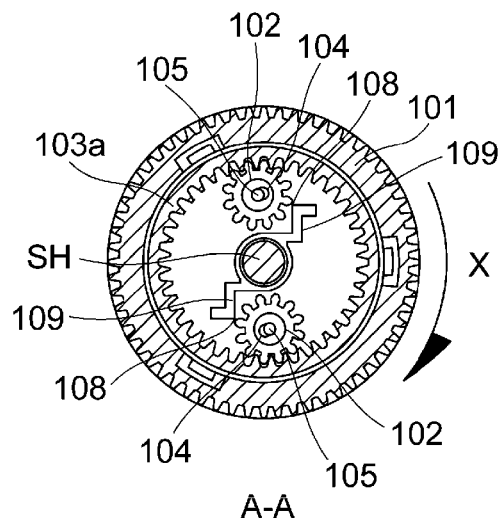
FIG. 5B is a cross sectional view taken along the inner gear position of the output gear when seen in arrow A direction of FIG. 5A.
Figure 5C:
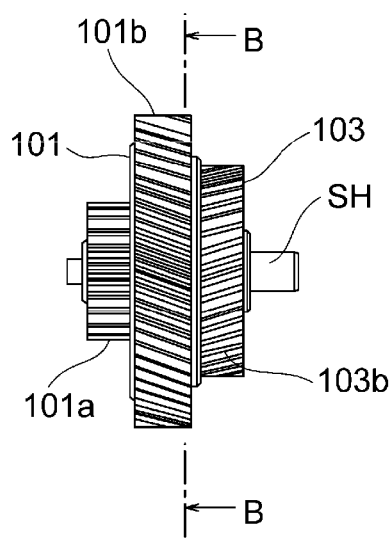
FIG. 5C is a cross sectional view illustrating the one-way clutch according to the first embodiment during forward rotation.
Figure 5D:
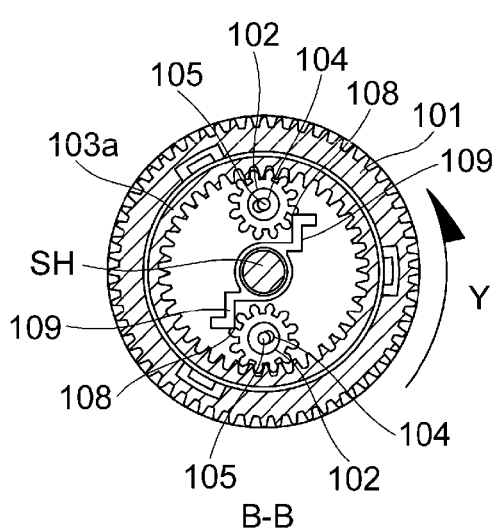
FIG. 5D is a cross sectional view taken along the inner gear position of the output gear when seen in arrow B direction of FIG. 5C.

(Operation of one-way unit 100 during forward backward rotation) FIG. 5A is a cross sectional view illustrating the one-way unit 100 during the backward rotation. FIG. 5B is a cross sectional view taken along the inner gear position of the output gear 103, and is a cross sectional view seen in the arrow A direction of FIG. 5A. FIG. 5C is a cross sectional view illustrating the one-way unit 100 during the forward rotation. FIG. 5D is a cross sectional view taken along the inner gear position of the output gear 103, and is a cross sectional view seen in the arrow B direction of FIG. 5C.

As illustrated in FIGS. 5C and 5D, the input gear 101 is a step gear having tooth surfaces 101a, 101b. When the tooth surface 101a receives driving in the forward direction (arrow Y direction of FIG. 5D), the stopper wall 109 moves in the forward direction. Then, the planet gear 102 is locked by the stopper wall 109, so that the planet gear 102 makes revolution motion (revolves) around the rotation shaft SH in the state that the planet gear 102 is substantially integrated with the input gear 101 (the planet gear 102 does not rotate on its own axis).

At this occasion, the planet gear 102 is held by the groove 104 in such a manner that the boss 105 engages therewith, and the tooth surface of the planet gear 102 engages with the inner teeth 103a of the output gear 103. While the boss 105 is urged against one end of the groove 104, the stopper wall 109 and the output gear 103 are connected while the tooth surface of the planet gear 102 is wedged between the edge portion 108 and the inner teeth 103a. Therefore, the planet gear 102 does not rotate on its own axis, and the driving force from the input gear 101 is transmitted via the planet gear 102 to the output gear 103.

As illustrated in FIGS. 5A and 5B, when the tooth surface 101a receives driving in the backward direction (arrow X direction of FIG. 5B), the stopper wall 109 also moves in the backward direction, and the stopper wall 109 is separated from the planet gear 102. Then, the other end of the groove 104 comes into contact with the boss 105, and the planet gear 102 is caused to revolve around the rotation shaft SH.

At this occasion, the tooth surface of the planet gear 102 engages with the inner teeth 103a of the output gear 103, but the edge portion 108 is separated from the tooth surface of the planet gear 102. More specifically, while the boss 105 is urged against the other end of the groove 104, the position of the planet gear 102 is restricted, and the planet gear 102 and the inner teeth 103a are configured with a shaft distance for making appropriate meshing, and the planet gear 102 makes revolution motion (rotates on its own axis) around the boss 105. Therefore, the driving force from the input gear 101 is not transmitted to the output gear 103.

(Operation sound during backward rotation of one-way unit) Finally, operation sounds will be compared when the one-way units according to the comparative example and the first embodiment are rotated in the backward direction (driving is cut off).

FIGS. 6A to 6E are explanatory diagrams illustrating a one-way clutch according to the comparative example. FIG. 6A is a cross sectional view illustrating the one-way clutch during the backward rotation. FIG. 6B is a cross sectional view taken along the inner gear position of the output gear 103, and is a cross sectional view seen in the arrow A direction of FIG. 6A. FIG. 6C is a cross sectional view illustrating the one-way clutch during the forward rotation. FIG. 6D is a cross sectional view taken along the inner gear position of the output gear 103, and is a cross sectional view seen in the arrow B direction of FIG. 6C. FIG. 6E is an exploded perspective view illustrating the one-way clutch according to the comparative example.

As illustrated in FIGS. 6A to 6E, the planet gear 102 driving and connecting the input gear 101 and the output gear 103 is stored in the space SP. The space SP is formed by the output gear 103 and the input gear 101. The position of the planet gear 102 is unstable (has play) with respect to the inner teeth 103a of the output gear 103.

As illustrated in FIG. 6C, during the forward rotation, the edge portion 108 provided on the input gear 101 pushes the planet gear 102. At this occasion, the planet gear 102 is wedged between the edge portion 108 and the inner teeth 103a, and the planet gear 102 does not rotate on its own axis. For this reason, driving transmission is achieved by connecting the input gear 101 and the output gear 103.

As illustrated in FIG. 6A, during the backward rotation, the edge portion 108 rotates in a direction away from the planet gear 102. Then, a cylindrical planet gear slide portion 110 provided on the input gear 101 pushes the planet gear 102. At this occasion, the planet gear 102 slides on the planet gear slide portion 110 and rotate on its own axis. Accordingly, the planet gear 102 idles with the inner teeth 103a, and the driving transmission from the input gear 101 to the output gear 103 is cut off.

In the configuration like the comparative example, the planet gear 102 is only restricted in terms of movement by the edge portion 108 and the planet gear slide portion 110, and like the present application, the position of the planet gear 102 is not restricted by the boss 105 and the groove 104. Therefore, when the driving transmission is cut off, the position of the planet gear 102 changes, and the inner teeth 103a of the output gear 103 and the planet gear 102 mesh each other and rotate while the distance between the shafts is unstable. The planet gear tooth tip slides on the cylindrical planet gear slide portion 110 provided on the input gear, and therefore, non-periodic hitting sound and slide sound are continuously made due to vibration and slide of the planet gear 102.

(Result of comparison) A result of comparison of operation sounds during backward rotation according to the first embodiment and the comparative example will be described. Sound pressure levels according to the first embodiment and the comparative example is compared. The sound pressure level is measured in proximity to the external housing of the image forming apparatus 1 by rotating the input side at 220 rpm in the backward direction (driving cut-off direction).

The measurement result of the sound pressure level is 45 dB in the first embodiment, and is 61 dB in the comparative example. Accordingly, in the present embodiment, the sound pressure level during the backward rotation can be reduced as compared with the configuration of the comparative example.

The increase in the sound pressure level caused by the nonperiodic hitting sound and slide sound generated from the one-way unit during the backward rotation in the configuration of the comparative example is about 21 dB. The remaining 40 dB is a sound generated from other elements. More specifically, the sound generated during the backward rotation from the one-way unit 100 according to the present embodiment can be said to be almost a level that is generated by meshing of gears (substantially 0 dB).

As described above, in the present embodiment, during the forward rotation of the input gear 101, the boss 105 slides to one end of the groove 104, and the planet gear 102 is wedged between the stopper wall 109 and the inner teeth 103a. During the backward rotation of the input gear 101, the boss 105 slides to the other end of the groove 104, and the position of the planet gear 102 is restricted, so that the planet gear 102 and the inner teeth 103a are at a shaft distance for making appropriate meshing. Therefore, the position of the planet gear 102 is stabilized, and as compared with the configuration for causing the planet gear of which position is unstable to slide and idle (the configuration of the comparative example), the operation sound can be reduced when the driving of the one-way unit 100 according to the present embodiment is cut off.

Second Embodiment

Subsequently, the second embodiment of the one-way clutch, the driving transmission unit, the fixing device, and the image forming apparatus according to the present invention will be described with reference to drawings. The same portions of which explanations are the same as those of the first embodiment described above are denoted with the same reference numerals, and explanations thereabout are omitted.

Figure 7A:
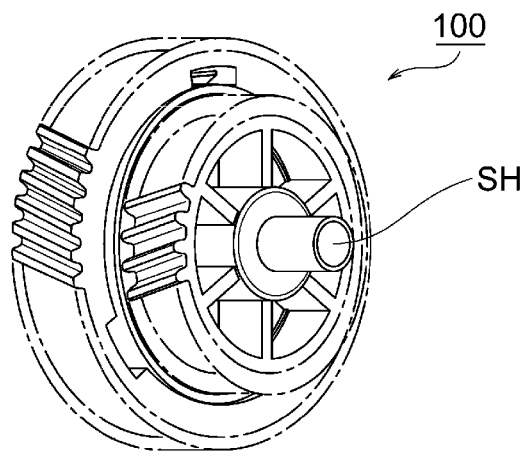
FIG. 7A is a perspective view illustrating a one-way clutch according to a second embodiment.
Figure 7B:
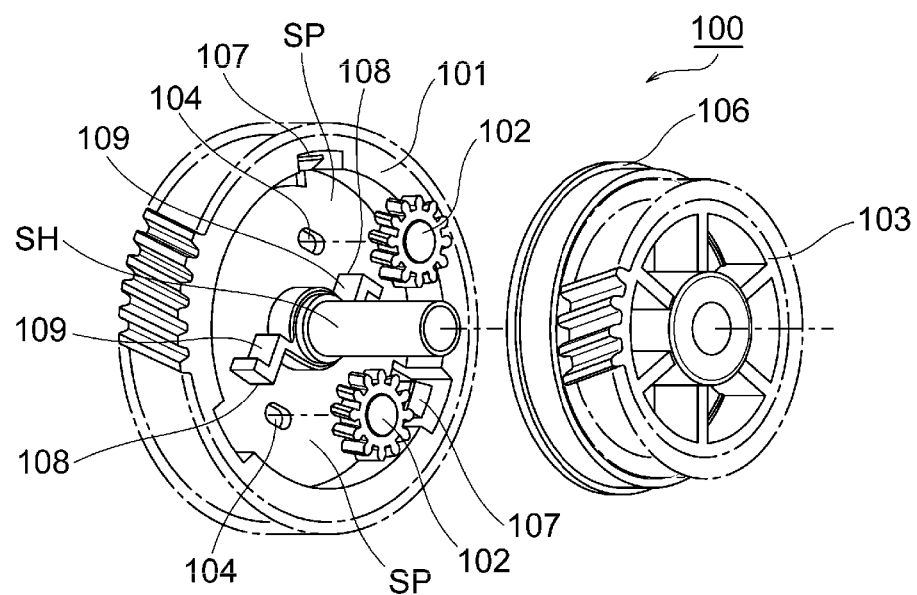
FIG. 7B is a configuration diagram illustrating the one-way clutch according to the second embodiment.
Figure 7C:
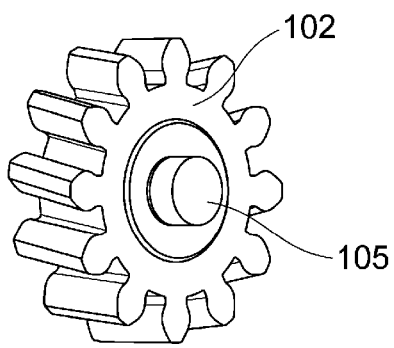
FIG. 7C is a perspective view illustrating a planet gear according to the second embodiment.

FIG. 7A is a perspective view illustrating a one-way clutch according to the present embodiment. FIG. 7B is an exploded perspective view illustrating the one-way clutch according to the present embodiment. FIG. 7C is a perspective view illustrating a planet gear 102 according to the present embodiment.

As illustrated in FIGS. 7A to 7C, in the one-way unit 100 according to the present embodiment, the planet gear 102 and the inner teeth 103a of the output gear 103 in the one-way unit 100 of the first embodiment are changed to helical gears.

The planet gear 102 according to the present embodiment is configured to have the same helix angle as the inner teeth 103a so as to make appropriate meshing. The edge portion 108 is formed in a helix manner with respect to the input gear 101 so that the edge of the edge portion 108 matches the tooth helix of the planet gear 102. The helix angle of the edge portion 108 is configured to match the helix angle of the planet gear 102.

The helix direction of the planet gear 102 is configured so that the planet gear 102 urges against the input gear 101 in the axial direction when the planet gear 102 rotates on its own axis in the space SP and idles with the inner teeth 103a.

More specifically, during the backward rotation, the planet gear 102 makes meshing rotation motion with the inner teeth 103a, so that the planet gear 102 is urged against the input gear 101 in the axial direction. Accordingly, the motion of the planet gear 102 in the axial direction can be reliably restricted by the boss 105 and the groove 104. Therefore, the operation sound caused when the planet gear 102 moves in the axial direction can be reduced.

In the present embodiment, the operation sound (sound pressure level) during the backward rotation measured just like the first embodiment is 40 dB, and the one-way unit 100 can reduce the operation sound when the driving is cut off.

According to the present invention, a relatively small number of components are used with a simple configuration, and the abnormal sound when the driving is cut off can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2013-136405, filed Jun. 28, 2013, which is hereby incorporated by reference herein in its entirety.

What is claimed is:

1. A one-way clutch comprising:
   an input gear;
   a planet gear provided in a space inside of the input gear;
   an output gear having an inner teeth meshing with the planet gear;
   a locking member provided in a space inside of the input gear, the locking member rotating together with the input gear, wherein when the input gear rotates in a forward direction, the locking member locks the planet gear so as not to allow the planet gear to rotate on its own axis, thus transmitting driving to the output gear, and when the input gear is rotated in the backward direction, the locking member is separated from the planet gear;

a protruding portion provided on the planet gear, the protruding portion being coaxial with the center of the planet gear;

a groove having an elongated hole shape provided on the input gear, the protruding portion fitting in the groove in a slidable manner, wherein when the input gear rotates in the forward direction, the protruding portion slides to one end of the groove, and the planet gear is wedged between the locking member and the inner teeth, and when the input gear rotates in the backward direction, the protruding portion slides to the other end of the groove so that the planet gear separates from the locking member.

2. The one-way clutch according to claim 1, wherein an inner teeth of the output gear and the planet gear are helical gears, and a direction of a helix is configured such that the planet gear is urged against the input gear in an axial direction during backward rotation of the input gear.

3. A driving transmission unit comprising:
the one-way clutch according to claim 1;
a first path configured to transmit driving that is received by a first tooth surface of the input gear, thus transmitting the driving from the output gear; and
a second path configured to transmit driving that is received by the first tooth surface of the input gear, thus transmitting the driving from a second tooth surface of the input gear.

4. A driving transmission unit comprising:
the one-way clutch according to claim 2;
a first path configured to transmit driving that is received by a first tooth surface of the input gear, thus transmitting the driving from the output gear; and
a second path configured to transmit driving that is received by the first tooth surface of the input gear, thus transmitting the driving from a second tooth surface of the input gear.

5. A fixing device comprising:
the driving transmission unit according to claim 3;
a pressure member configured to rotate when driving is transmitted from the first path;
a heating member configured to be separated from the pressure member when driving is transmitted from the second path.

6. A fixing device comprising:
the driving transmission unit according to claim 4;
a pressure member configured to rotate when driving is transmitted from the first path;
a heating member configured to be separated from the pressure member when driving is transmitted from the second path.

7. An image forming apparatus comprising:
an image forming portion configured to form a toner image; and
the fixing device according to claim 5;
wherein the fixing device fixes a toner image formed by the image forming portion onto a sheet.

8. An image forming apparatus comprising:
an image forming portion configured to form a toner image; and
the fixing device according to claim 6;
wherein the fixing device fixes a toner image formed by the image forming portion onto a sheet.

* * * * *